(12) United States Patent
Crorey

(10) Patent No.: US 6,708,421 B1
(45) Date of Patent: Mar. 23, 2004

(54) LOCATING DEVICE

(76) Inventor: David J. Crorey, 19862 Westchester, Clinton Township, MI (US) 48083

( * ) Notice: Subject to any disclaimer, the term of this patent is extended or adjusted under 35 U.S.C. 154(b) by 0 days.

(21) Appl. No.: 10/321,421

(22) Filed: Dec. 16, 2002

(51) Int. Cl.⁷ .............................................. G01D 21/00
(52) U.S. Cl. .............................. 33/613; 33/528; 33/645; 33/DIG. 10; 33/DIG. 1
(58) Field of Search ......................... 33/613, 528, 645, 33/DIG. 10, DIG. 1

(56) References Cited

U.S. PATENT DOCUMENTS

| | | | |
|---|---|---|---|
| 1,719,812 A | | 7/1929 | Shaw et al. |
| 1,971,189 A | | 8/1934 | Leibing |
| 3,722,360 A | * | 3/1973 | Blakey et al. ................. 33/613 |
| 3,723,928 A | * | 3/1973 | Blakey et al. .......... 33/DIG. 10 |
| 4,384,396 A | | 5/1983 | Smolik |
| 4,388,890 A | | 6/1983 | Wester et al. |
| 4,901,447 A | * | 2/1990 | Gottschalk ................... 33/613 |
| 5,117,720 A | * | 6/1992 | Bussi .................... 33/DIG. 10 |
| 5,172,483 A | * | 12/1992 | Yocono et al. ................ 33/528 |
| 5,348,274 A | * | 9/1994 | Breen ........................ 33/613 |
| 5,434,500 A | | 7/1995 | Hauck et al. |
| 5,615,490 A | * | 4/1997 | Burchell ...................... 33/528 |
| 5,711,082 A | * | 1/1998 | Olivo ......................... 33/528 |
| 6,201,396 B1 | * | 3/2001 | Matsuo et al. ............ 33/355 R |
| 6,403,883 B1 | | 6/2002 | Morgan et al. |
| 6,452,097 B1 | | 9/2002 | DeWall |

* cited by examiner

*Primary Examiner*—Diego Gutierrez
*Assistant Examiner*—Amanda J Hoolahan
(74) *Attorney, Agent, or Firm*—Young & Basile, P.C.

(57) ABSTRACT

A locating device for locating a body such as an electrical box behind a wall or ceiling. The device includes a first member positionable in the body and a second member that can be positioned on the outer surface of the wall or ceiling. A magnet positioned in the first member cooperates with a magnet positioned in the second member to maintain the second member in an aligned position with respect to the electrical box. Two magnets can be used to enhance the alignment of the second member with the electrical box. A circular first member can be used for locating circular boxes or lights. A second member having an arm can be used with a circular first member. The second member can include a plurality of apertures, each aperture sized to correspond to a specific size light or electrical box.

19 Claims, 2 Drawing Sheets

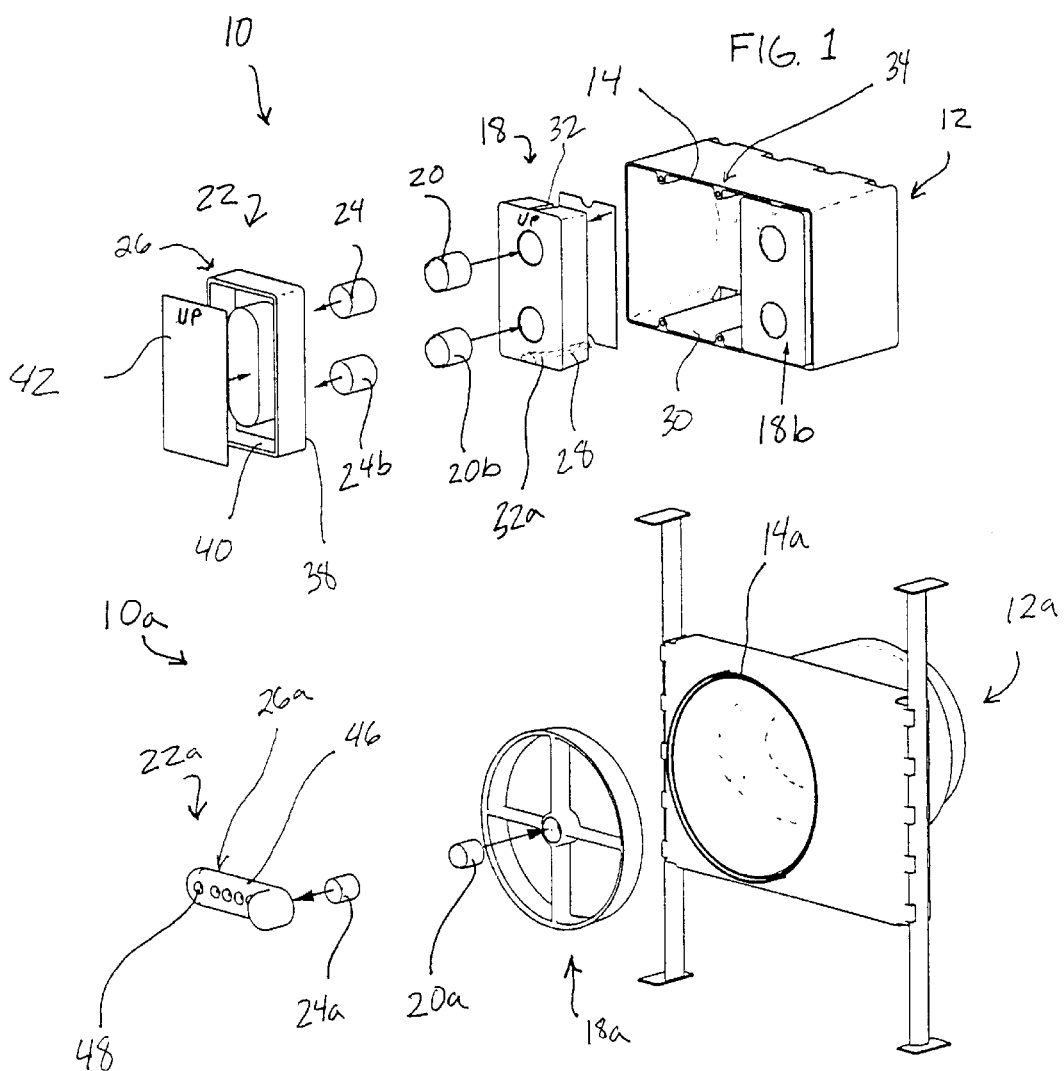

LOCATING DEVICE

FIELD OF THE INVENTION

The invention relates to an apparatus and method for locating a device behind a wall or ceiling and, more specifically, the invention provides a device for defining the perimeter of a body rigidly mounted behind a wall or ceiling.

BACKGROUND OF THE INVENTION

During the construction of buildings and structures, object or bodies are fixedly associated or rigidly mounted with respect to structural frame members such as wood or metal studs. After the bodies are mounted to the structural frame members, sheet material such as drywall, paneling or plywood is placed over the structural members, concealing the bodies mounted to the structural members. Before the building or structure is complete, the sheet material must be cut or pierced to expose the bodies. Generally, the bodies are used for communicating electricity to predetermined positions in the building.

SUMMARY OF THE INVENTION

The invention provides a locating device for defining a perimeter of a body rigidly positioned behind a sheet of material, such as an electrical box mounted to a stud and positioned behind a sheet of drywall, paneling or plywood. The locating device includes a first member that can be positioned in the body and has at least one magnet. The locating device also includes a second member that can be positioned on an outer surface of the sheet of material adjacent to the body. The second member includes at least one magnet and means to define the perimeter of the body with respect to the outer surface of the sheet of material. The magnet of the first member cooperates with the magnet of the second member to substantially align the perimeter defining means of the second member with the perimeter of the body.

The means for defining the perimeter of the body can define the perimeter of the body with respect to the outer surface of the sheet material before the sheet material is pierced. The means for defining the perimeter of the body can be a perimeter of the second member. For example, the second member can be shaped to substantially correspond to the shape of the body. A marking instrument can trace the perimeter or outline of the second member and thereby define the perimeter of the body. Alternatively, the means for defining the perimeter of the body can be an aperture defined by the second member. For example, the second member can be shaped with an arm that can rotate about the magnet. The aperture can pierce the arm. As the arm is rotated around the magnet, the aperture can guide a marking instrument for tracing a circle and defining the perimeter of a circular body behind the sheet of material. The invention can be practiced with a plurality of first members, each of the plurality of first members configured to engage a differently configured body. The arm of the second member can include a plurality of apertures, each of the plurality of apertures spaced from the magnet a distance corresponding to a perimeter of one of a plurality of differently sized bodies.

The first and second member can each include more than one magnet. The magnets of the first and second members can cooperate with a predetermined magnetic force operable to maintain the second member adjacent to the first member on the outer surface of the sheet of material. For example, if the first and second member are aligned so that perimeter defining means is aligned with the perimeter of the body, the second member can remained positioned on the outer surface of the sheet material, maintained in position by the magnetic force between the magnets of the first and second members. Also, the second member can have a predetermined weight to maintain the second member adjacent to the first member on the outer surface of the sheet of material when a magnetic force between the magnets of the first and second members is fixed. The weight of the second member can be modified by forming the second member with a cavity for receiving a weight member.

In embodiments of the invention were the first and second members each include more than one magnet, the magnets of the first magnet can be oriented with opposite polarity. For example, a first magnet of the first member can include an outwardly facing surface having a North polarity and a second magnet of the first member can include an outwardly facing surface having a South polarity. The second member can include two magnets similarly oriented. In such an embodiment of the invention, the alignment of the perimeter defining means of the second member with the perimeter of the body can be enhanced.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is an exploded isometric view of a first embodiment of the locating device according to the present invention;

FIG. 2 is an exploded isometric view of a second embodiment of a locating device according to the present invention.

DESCRIPTION OF THE PREFERRED EMBODIMENT

Figure 3:
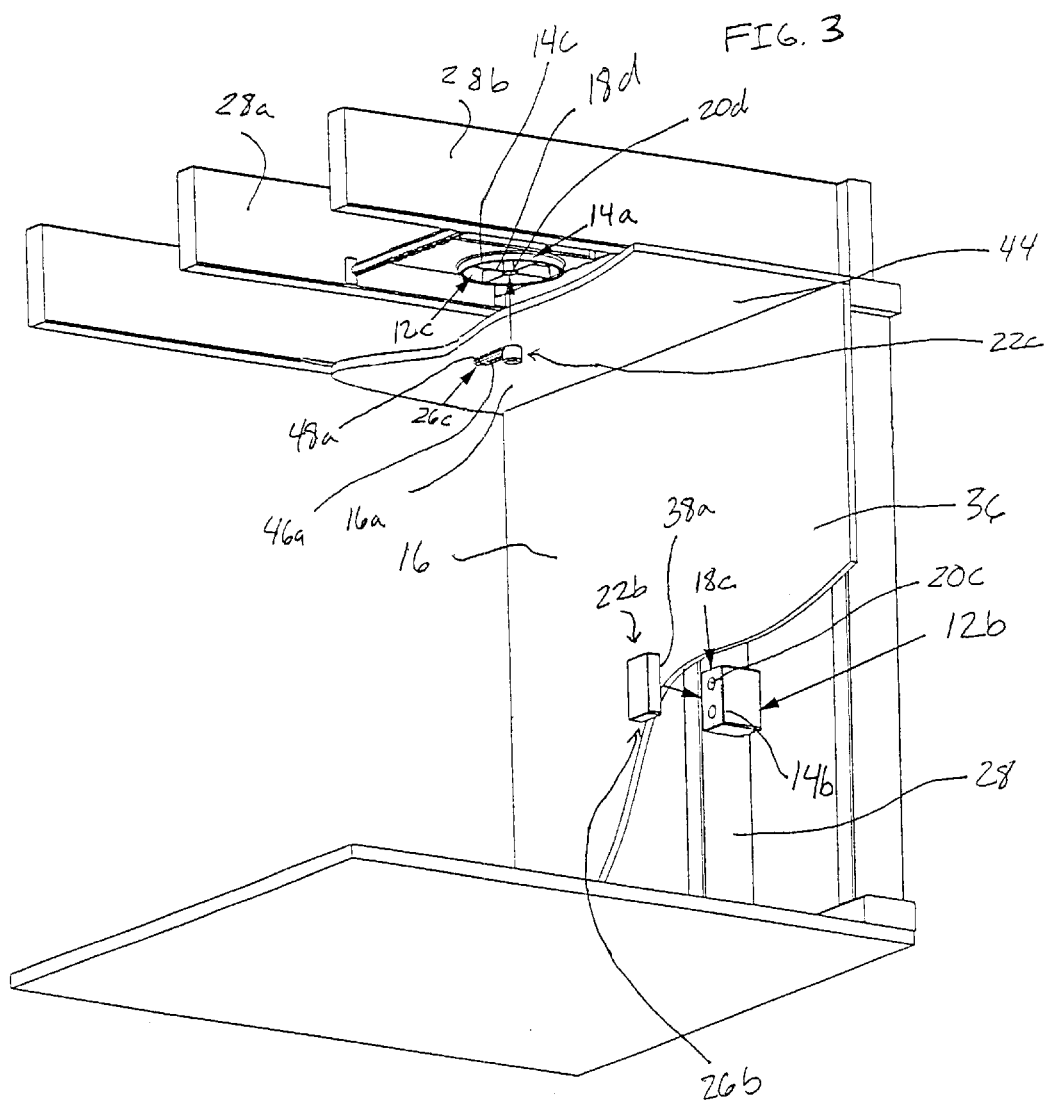
FIG. 3 is a partial cross-section isometric view of locating devices according to the present invention in operation in a structure.

Various embodiments of the invention are shown throughout the figures. The figures include common elements in different structural configurations. Common elements are designated with a common base numeral and differentiated with an alphabetic designation.

Referring now to FIG. 1, the invention provides a locating device 10 for defining at least a portion of a perimeter 14 of a body 12 with respect to an outer surface of a sheet of material wherein the body 12 is rigidly positioned behind the sheet of material. The locating device 10 includes a first member 18 positionable internal with respect to the body 12 and having at least one magnet 20. The locating device 10 also includes a second member 22 positionable on an outer surface of a sheet of material adjacent to the body 12. The second member includes at least one magnet 24 and includes means 26 for defining the perimeter 14 of the body 12 with respect to the outer surface of the sheet material. The magnet 20 of the first member 18 cooperates with the magnet 24 of the second member 22 to substantially align the perimeter defining means 26 with the perimeter 14 of the body 12.

Referring now to FIG. 3, the body 12b is rigidly positioned or immovably associated with a structural member 28. The body 12b is positioned behind a sheet 16 of material. The sheet 16 defines a wall and can be formed from drywall, paneling or plywood.

Referring now to FIG. 1, a first member 18b is shown positioned internal with respect to the body 12. The first member 18 includes an outer surface 28 shaped to conform to at least a portion of an inner surface 30 of the body 12. In FIG. 1, a plurality of first members can be positioned in a single body. As shown in FIG. 3, a single member 18c can be positioned in a body 12b. As shown in FIG. 1, the outer surface 28 of the first member 18 can define at least one notch 32 to correspond to a boss 34 extending from the inner surface 30 of the body 12. Notches can be defined at two opposite portions of the first member 18, a second notch 32a is shown in phantom.

Referring now to FIG. 3, the second member 22b is positionable on an outer surface 36 of the sheet 16 adjacent the body 12b and the magnet 20c of the first member 18c can cooperate with a magnet of the second member 22b, such as magnet 24 shown in FIG. 1, to substantially align perimeter defining means 26b with the perimeter 14b of the body 12b. The magnets cooperate in that one of the magnets exposes toward the sheet 16a "north" pole, or a positive polarity, and one of the magnets exposes toward the sheet 16a "south" pole, or a negative polarity. The magnets can cooperate such that the second member 22b can be suspended on the sheet 16 by the magnetic attraction between the magnets. For example, if the magnet 20c of the first member 18c is not cooperating with the magnet of the second member 22b, the member 22b will slide or fall to the ground. When the magnets of the first member 18c and the second member 22b are cooperating, the magnetic attraction between the magnets will substantially align perimeter defining means 26b with the body 12b. The perimeter defining means 26b is aligned with the body 12b when the perimeter defining means 26b substantially corresponds to the perimeter 14b.

In operation, the perimeter defining means 26b can define the perimeter 14b of the body 12b with respect to the outer surface 36 of the sheet 16 before the sheet 16 is pierced by a piercing or cutting tool. The first member 18c can be positioned internal of the body 12b. The sheet 16 can be positioned and mounted with respect to structural members such as structural member 28 and conceal or hide the body 12b. The second member 22b can be moved along the surface 36 of the sheet 16 until the magnetic attraction between the magnet 20c of the first member 18c and the magnet (not shown) of the second member 22b becomes apparent and the second member 22b can be left suspended with respect to the sheet 16. A marking instrument can be used to trace the perimeter defining means 26b, the tracing corresponding to the perimeter 14b of the body 12b. In this embodiment of the invention perimeter defining means 26b is the perimeter 38a or outline or shape of the second member 22b. The second member 22b can be removed from the sheet 16 and the sheet 16 can be cut or pierced to expose the body 12b. A lid 42 can substantially close a cavity 40 of the second member 22.

The first and second members can include textual information. For example, as shown in FIG. 1, the first member 18 and second member 22 can display the term "UP" to assist a user in aligning the first and second members 18, 22. The textual information can be formed integral with the members 18, 22, for example, stamped or molded with respect to the members 18, 22. Alternatively, the textual information can be engaged with the members 18, 22, such as with an adhesive label.

Referring to FIG. 1, where the locating device 10 is applied to define the perimeter 14 of the body 12, a plurality of first members similar to first members 18 and 18b can be positioned internal of the body 12 after the body has been rigidly mounted to a structural member and a sheet of material has been positioned over the body 12. The second member 22 can be moved along a surface of the sheet until the magnetic attraction between the magnet, such as a magnet 20 of one of the first members positioned internal of the body 12 and the magnet 24 of the second member 22 becomes apparent and the second member 22 can be left suspended with respect to the sheet. A marking instrument can be used to trace the perimeter defining means 26, the tracing corresponding to the perimeter 14 of the body 12. These steps can be repeated for each of the first members positioned internal of the body 12. The perimeter 14 of the body 12 can be defined by the outline or outermost markings of the several tracings.

Referring now to FIGS. 1 and 3, the at least one magnet of the first member can include first and second magnets and the at least one magnet of the second member can include third and fourth magnets. For example, the first member 18 can include magnets 20 and 20b. The second member 22 can include magnets 24 and 24b. The magnets 20 and 20b can be mountable with respect to the first member 18 spaced apart relative to one another a first, or predetermined distance. The first distance can selected based on the configuration of the first member. For example, a larger first member can include two magnets spaced apart a greater distance than two magnets associated with a smaller first member. The magnets 24 and 24b can be mountable with respect to the second member 22 spaced apart relative to one another the first distance. It has been found that increasing the number of magnets mounted with respect to the first member 18 and the second member 22 can enhance the alignment of the perimeter defining means 26 with the body 12. The magnets mounted with respect to the first member 18 and the second member 22 can be oriented such that magnet 20 exposes a magnetic field toward the sheet 16 having a positive polarity or "north" pole and the magnet 20b can expose a magnetic field toward the sheet 16 having a negative polarity or a "south" pole. Similarly, the magnet 24 can expose toward the sheet 16 a negative polarity and the magnet 24b can expose toward the sheet 16 a positive polarity. Such an embodiment of the invention can be advantageous if the body 12 is asymmetrical about a particular axis.

Referring now to FIG. 2, in a second embodiment of the locating device 10a, a first member 18a positionable internal with respect to a body 12a. The first member 18a includes at least one magnet 20a. The locating device 10a also includes a second member 22a having at least one magnet 24a. The magnets 20a and 24a cooperate to substantially align perimeter defining means 26a with the body 12a.

Referring now to FIG. 3, the second member 22c is positionable on an outer surface 44 of a sheet 16a, such as a ceiling, adjacent the body 12b. The second member 22c includes perimeter defining means 26c. The body 12b is rigidly positioned behind the sheet 16a to structural members 28a and 28b.

Referring now to FIG. 2, the second member 22a can include an arm 46 rotatably engagable with respect to the magnet 24a. Perimeter defining means 26a can include at least one aperture 48 defined by the second member 22a.

Referring now to FIG. 3, the body 12b is rigidly positioned with respect to the structural members 28a and 28b. The first member 18d, similar to the first member 18a shown in FIG. 2, is positioned internal with respect to the body 12b. The sheet 16a, defining a ceiling, is positioned with respect to the structural members 28a and 28b, covering or concealing the body 12b and first member 18d. The second member 22c is moved about the outer surface 44 of the sheet 16a until the cooperation between the magnet 20d of the first member 18d and the magnet of the second member 22c is perceived and the second member 22c is suspended by the cooperation between the magnets. A marking instrument can be inserted with respect to the aperture 48a of the second member 22c and the arm 46a can be rotated about the magnet of the second member 22c. The tracing or marking formed by the marking instrument during the rotation of the arm 46a about the magnet defines or corresponds to the perimeter 14c of the body 12b.

The second member 22a can include a plurality of apertures similar to aperture 48, as shown in FIG. 2. The locating device 10a can also include a plurality of differently sized first members. Each of the plurality of first members can be sized to be positionable internal with respect to a plurality of differently sized bodies. Each of the apertures defined by the second member 22a can correspond to a differently sized body.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for defining at least a portion of a perimeter of a body with respect to an outer surface of a sheet of material wherein the body is rigidly positioned behind the sheet of material comprising:
    a first member positionable internal with respect to the body and having at least one magnet; and
    a second member positionable on an outer surface of the sheet of material adjacent the body, having at least one magnet, and including means to define the perimeter of the body with respect to the outer surface of the sheet of material, wherein the at least one magnet of the first member cooperates with the at least one magnet of the second member to substantially align said perimeter defining means with the body.

2. The apparatus of claim 1 wherein said perimeter defining means is operable to define the perimeter of the body with respect to the outer surface of the sheet material before the sheet material is pierced.

3. The apparatus of claim 1 wherein:
    the at least one magnet of the first member includes first and second magnets; and
    the at least one magnet of the second member includes third and fourth magnets.

4. The apparatus of claim 1 wherein the at least one magnet of the first member and the at least one magnet of the second member cooperate with a predetermined magnetic force operable to maintain the second member including said perimeter defining means adjacent the first member on the outer surface of the sheet of material.

5. The apparatus of claim 4 wherein the second member has predetermined mass such that the weight of the second member will be greater than the magnetic force if the at least one magnet of the first member and the at least one magnet of the second member are not aligned to a predetermined degree.

6. The apparatus of claim 1 wherein said perimeter defining means further comprises:
    a perimeter of the second member.

7. The apparatus of claim 6 wherein:
    the at least one magnet of the first member includes at least first and second magnets; and
    the at least one magnet of the second member includes at least third and fourth magnets.

8. The apparatus of claim 7 wherein the first and second magnets are mountable with respect to the first member spaced apart a first distance and the third and fourth magnets are mountable with respect to the second member spaced apart the first distance.

9. The apparatus of claim 7 wherein the first magnet is operable to magnetically cooperate with only one of the third and fourth magnets.

10. The apparatus of claim 7 wherein the first and second magnets are mounted with respect to the second member such that a polarity of an outwardly facing surface of the first magnet is opposite of a polarity of an outwardly facing surface of the second magnet.

11. The apparatus of claim 6 wherein the second member further comprises:
    a cavity.

12. The apparatus of claim 6 further comprising:
    said second member including means for providing textual information.

13. The apparatus of claim 6 wherein the first member further comprises:
    at least one notch defined by an outer surface of the first member sized to correspond to a boss extending from the body.

14. The apparatus of claim 1 wherein said perimeter defining means further comprises:
    at least one aperture defined by the second member.

15. The apparatus of claim 14 wherein the second member further comprises:
    an arm rotatably engagable with respect to the at least one magnet of said second member.

16. The apparatus of claim 15 wherein the at least one aperture is defined by the arm, spaced from the at least one magnet of said second member, and movable about a circular path corresponding to the perimeter of the body.

17. The apparatus of claim 16 wherein the at least one aperture further comprises:
    a plurality of apertures, each of the plurality of apertures spaced from the at least one magnet of said second member a distance corresponding to a perimeter of one of a plurality of differently sized bodies.

18. In a structure having an electrical box hidden behind sheet material forming one of a ceiling and a wall, the improvement for forming an aperture in the wall adjacent the electrical box comprising:
    a first member positionable in the box and having at least one magnet; and
    a second member positionable on the wall adjacent the box and having at least one magnet, wherein the second member includes means for defining a perimeter of the box on an outer surface of the sheet material before piercing the sheet material wherein the at least one magnet of said first member cooperates with the at least one magnet of said second member to substantially align said perimeter defining means with the box.

19. A method for defining at least a portion of a perimeter of a body with respect to an outer surface of a sheet of material wherein the body is rigidly positioned behind the sheet of material comprising:

positioning a first member having at least one magnet internal with respect to the body; and positioning a second member on an outer surface of the sheet of material adjacent the body, the second member including at least one magnet and means to define the perimeter of the body with respect to the outer surface of the sheet of material, wherein the at least one magnet of the first member cooperates with the at least one magnet of the second member to substantially align said perimeter defining means with the body.

* * * * *